United States Patent [19]

Martin et al.

[11] Patent Number: 5,319,029
[45] Date of Patent: Jun. 7, 1994

[54] POLYETHYLENE BLENDS

[75] Inventors: Joel L. Martin; M. Bruce Welch; William R. Coutant; Max P. McDaniel, all of Bartlesville, Okla.

[73] Assignee: Phillips Petroleum Company, Bartlesville, Okla.

[21] Appl. No.: 48,631

[22] Filed: Apr. 16, 1993

Related U.S. Application Data

[63] Continuation-in-part of Ser. No. 761,601, Sep. 18, 1991, abandoned.

[51] Int. Cl.$^5$ .................. C08L 23/06; C08L 23/08; C08L 23/16
[52] U.S. Cl. .................................................. 525/240
[58] Field of Search ....................................... 525/240

[56] References Cited

U.S. PATENT DOCUMENTS

| | | | |
|---|---|---|---|
| 3,127,370 | 3/1964 | Head | 525/240 |
| 3,179,720 | 4/1965 | Hilmer | 525/240 |
| 4,336,352 | 6/1982 | Sakurai et al. | 525/240 |
| 4,536,550 | 8/1985 | Moriguchi et al. | 525/240 |
| 4,603,173 | 7/1986 | Mack et al. | 525/240 |
| 4,617,352 | 10/1986 | Page et al. | 525/240 |
| 4,824,912 | 4/1989 | Su | 525/240 |
| 4,835,219 | 5/1989 | Tajima et al. | 525/240 |
| 4,840,996 | 6/1989 | Wild et al. | 525/240 |
| 4,842,922 | 6/1989 | Krupp et al. | 525/240 |
| 4,954,391 | 9/1990 | Katani et al. | 525/240 |

FOREIGN PATENT DOCUMENTS 61-057638 3/1986 Japan.
790115 2/1958 United Kingdom.

OTHER PUBLICATIONS

Modern Plastics-1963 ED-pp. 227-1962.

Primary Examiner—Carman J. Seccuro, Jr.
Attorney, Agent, or Firm—Carl D. Corvin

[57] ABSTRACT

A composition of matter comprising: (a) 5 to 40 weight percent inclusive of a low molecular weight ethylene resin made using a titanium catalyst system said resin having a density greater than 0.955 grams per cubic centimeter, a melt index greater than 25 grams per 10 minutes, and a heterogeneity index between 2 and 8 inclusive; and (b) 60 to 95 weight percent inclusive of a high molecular weight ethylene copolymer resin made using a chromium catalyst system said resin having a density of at least 0.93 grams per cubic centimeter, a high load melt index between 1.5 and 15 grams per 10 minutes, and a heterogeneity index between 6 and 100 inclusive; wherein said composition of matter has a melt index greater than 0.05 grams per 10 minutes.

6 Claims, No Drawings

POLYETHYLENE BLENDS

CROSS REFERENCE TO RELATED APPLICATION

This patent application is a continuation-in-part of patent application Ser. No. 07/761,601 which was filed on Sep. 18, 1991, now abandoned, the entire disclosure of which is hereby incorporated by reference.

BACKGROUND OF THE INVENTION

This invention relates to polyethylene blends.

It is known in the art to blend components with dissimilar characteristics to achieve a blend with superior performance properties. However, this task is not easy to accomplish. For example, the components of a blend can interact antagonistically resulting in a lowering of the expected performance of the blend, or the components can interact producing a blend that is only the mere aggregation of the separate component parts.

Thermoplastic blends are very desirable for applications such as pipes, films, and bottles. However, each application requires a resin tailored for that particular application. Furthermore, each of these tailored resins are judged by many performance attributes. While it is possible to improve one attribute it is often necessary to find a compromise of the various attributes in order to find a resin which fulfills the customers requirements.

This invention provides an improved compromise of characteristics thereby increasing the availability of possible solutions to consumer demands.

SUMMARY OF THE INVENTION

It is an object of this invention to provide an improved polyethylene blend.

It is another object of this invention to provide a polyethylene blend with an improved environmental stress crack resistance.

These and other objects of this invention will become apparent to those skilled in the art from the following detailed description of the invention.

In accordance with this invention, a composition of matter is provided comprising: (a) 5 to 40 weight percent inclusive of a low molecular weight ethylene resin made using a titanium chloride based catalyst system said resin having a density greater than 0.955 grams per cubic centimeter, a melt index greater than 25 grams per 10 minutes, and a heterogeneity index between 2 and 8 inclusive; and (b) 60 to 95 weight percent inclusive of a high molecular weight ethylene copolymer resin made using a chromium oxide based catalyst system said resin having a density of at least 0.93 grams per cubic centimeter, a high load melt index between 1.5 and 15 grams per 10 minutes, and a heterogeneity index between 6 and 100 inclusive; wherein said composition of matter has a melt index greater than 0.05 grams per 10 minutes.

In another embodiment of this invention a composition of matter is provided comprising:

(a) 5 to 24 weight percent of a low molecular weight ethylene homopolymer resin, where said resin is made by polymerizing ethylene with a titanium chloride based catalyst system, and where said resin has a density greater than 0.96 grams per cubic centimeter, a melt index greater than 30 grams per 10 minutes, and a heterogeneity index from 2 to 8, (b) 76 to 95 weight percent of a high molecular weight ethylene copolymer resin, where said resin is made by copolymerizing ethylene and an alpha-olefin with a chromium oxide based catalyst system, and where said resin has a high load melt index greater than 1.5 grams per 10 minutes but less than 15 grams per 10 minutes, and a heterogeneity index from 6 to 100, where said weight percents are based on the total weight of said resins (a) and (b); and wherein said composition of matter has a melt index greater than 0.05 grams per 10 minutes and is essentially free of other ethylene polymers.

DETAILED DESCRIPTION OF THE INVENTION

The composition of this invention comprises two components. The first component comprises a low molecular weight polyethylene made using a titanium chloride based catalyst system. The second component comprises a high molecular weight polyethylene made using a chromium oxide based catalyst system. These two components are blended together to provide a polyethylene blend which has desirable properties. Further information concerning the characteristics of these two components is given below.

Polyethylene is a thermoplastic material available in a wide range of flow rates and densities. Polyethylene offers useful properties such as toughness at a variety of temperatures, stiffness ranging from flexible to rigid, as well as excellent chemical resistance. Currently, polyethylene can be fabricated and processed by most known thermoplastic processes in the art.

Polyethylene is generally classified primarily on the basis of two characteristics, namely, density and flow rate (commonly identified as melt index). ASTMD 1248-84 (reapproved 1989) provides a convenient system for categorizing polyethylene resins. First, polyethylene resins are generally classified according to density: type I polyethylene has a nominal density between 0.910–0.925 grams/cubic centimeter ($g/cm^3$); type II polyethylene has a nominal density between 0.926–0.940 $g/cm^3$; type III polyethylene has a nominal density between 0.941–0.959 $g/cm^3$; and type IV polyethylene has a nominal density of 0.960 $g/cm^3$ or above. Type I polyethylene is usually defined as a low density resin. Type II polyethylene is usually classified as a medium density resin. Type III and IV polyethylene resins are usually classified as high density resins.

Within each density type there exists five different categories of flow rates. A category 1 polyethylene resin has a nominal flow rate greater than 25 g/10 min. at a temperature of 190° C. and under a 2160 gram weight load. A category 2 polyethylene resin has a nominal flow rate greater than 10 and up to and including 25 g/10 min. A category 3 polyethylene resin has a nominal flow rate greater than 1 up to and including 10 g/10 min. A category 4 polyethylene resin has a nominal flow rate greater than 0.4 up to an including 1.0 g/10 min. A category 5 polyethylene resin has a nominal flow rate equal to or less than 0.4 g/10 min.

These types and categories of polyethylene resin can be made by various processes known in the art. For example, types I and II polyethylene can be made by a high pressure process which uses oxygen, peroxide and/or other strong oxidizers as a catalyst. Pressures of reaction ranging from 100 to 350 MPa are typically employed. Polyethylene resins formed in these types of processes are highly branched with short side chains occurring every 15 to 40 carbon atoms on the chain backbone. Furthermore, the crystallinity of these types of polyethylene resins is approximately 40 to 60 percent with the amorphous content of the polymer increasing as the density is reduced.

On the other hand, types I, II, III, and IV polyethylene can be produced from such processes as slurry, solution, or gas phase processes. These processes are generally known as low pressure processes. Catalysts used in these processes vary widely, but the most frequently used are transition metals in combination with metal halides or activated metal oxides. Reaction pressures normally fall within 0.25 MPa to 6 MPa. The polyethylene produced by these processes is more linear in nature, that is, little or no long chain branching occurs. Linear polyethylene of types I and II is approximately 50 percent crystalline and types III and IV can be as high as 85 percent crystallinity or more. Generally, polyethylenes made by a low pressure process which have a density below 0.960 are made by polymerizing ethylene with a small amount of comonomer such as propylene, 1-butene and/or 1-hexene.

Low Molecular Weight Polyethylene Resin

The low molecular weight polyethylene resin must be produced from a titanium chloride based catalyst system. Exemplary titanium chloride based catalyst systems are broadly disclosed in U.S. Pat. Nos. 4,394,291; 4,236,988; and 4,347,158; which are hereby incorporated by reference.

The low molecular weight polyethylene resin can be any new or recycled ethylene resin. However, it is preferred if the low molecular weight ethylene polymer is a homopolymer. This is because of the better stiffness that can be imparted to the ethylene blend by this ethylene component. Additionally, it is preferred if the low molecular weight ethylene polymer is made by polymerizing ethylene with a titanium chloride based catalyst system. Generally, the characteristics of the low molecular weight polyethylene resin are those listed below in Table I.

In another embodiment of this invention it is preferred that the low molecular weight ethylene homopolymer resin be from 5 to 24 weight percent of the polymer composition where the weight percent is based on the weight of the low molecular weight ethylene homopolymer and the high molecular weight copolymer. Additionally, it is preferred if the melt index is greater than 30 grams per 10 minutes.

The low molecular weight polyethylene resin generally has a very low environmental stress crack resistance (ESCR).

High Molecular Weight Polyethylene Resin

The high molecular weight polyethylene resin must be produced from a chromium oxide based catalyst system. Exemplary chromium catalyst systems are broadly disclosed in U.S. Pat. Nos. 3,887,494; 3,900,457; 3,947,433; 4,053,436; 4,151,122; 4,294,724; 4,364,839; 4,364,841; 4,364,841; 4,392,990; and 4,405,501; which are hereby incorporated by reference.

The high molecular weight polyethylene resin can be any new or recycled ethylene copolymer resin. This is because of the better environmental stress crack resistance that can be imparted to the ethylene blend by this ethylene components. The comonomer used to produce the copolymer is generally an alpha-olefin with about 3 to about 20 carbon atoms per molecule. Preferably, the comonomer has from about 3 to about 10 carbon atoms per molecule and most preferably from about 3 to about 8 carbon atoms per molecule. Examples of alpha-olefins useful in this invention as comonomers are propylene, 1-butene, 3-methyl-1-butene, 1-pentene, 3-methyl-1-pentene, 4-methyl-1-pentene, 1-hexene, 3-ethyl-1-hexene and 1-octene. The amount of comonomer incorporated will generally comprise less than about 40 weight percent of the high molecular weight resin. Preferably, the high molecular weight polyethylene resin will comprise from about 0.0001 to about 30 weight percent comonomer, and most preferably will comprise from about 0.01 to about 15 weight percent comonomer. Generally, the characteristics of the high molecular weight polyethylene resin are those listed below in Table II.

TABLE I

| | Low Molecular Weight Polyethylene Resin Characteristics | | |
|---|---|---|---|
| Characteristic | Broad Range | Preferred Range | Most Preferred Range |
| Density[1] | $D \geq 0.955$ | $D \geq 0.96$ | $0.96 \leq D \leq 0.98$ |
| Heterogeneity Index[2] | $2 \leq H.I. \leq 8$ | $2 \leq H.I. \leq 7$ | $2 \leq H.I. \leq 6$ |
| Melt Index[3] | $MI > 25$ | $30 \leq M.I. \leq 1500$ | $75 \leq M.I. \leq 1000$ |
| Weight Percent[4] | $5 \leq W.P. \leq 40$ | $8 \leq W.P. \leq 35$ | $10 \leq W.P. \leq 33$ |

[1] Density is in grams per cubic centimeter.
[2] The Heterogeneity Index is a measure of the molecular weight distribution. This is a valuable indicator of a resin's usefulness in certain applications. It is the weight average molecular weight divided by the number average molecular weight.
[3] Melt Index is in grams per 10 minutes at FR-190/2.16.
[4] The Weight Percent is based on the total weight of both the low molecular weight polyethylene resin and the high molecular weight polyethylene resin.

TABLE II

| | High Molecular Weight Polyethylene Resin Characteristics | | |
|---|---|---|---|
| Characteristic | Broad Range | Preferred Range | Most Preferred Range |
| Density[1] | $D \geq 0.93$ | $0.94 \leq D \leq 0.975$ | $0.95 \leq D \leq 0.965$ |
| Heterogeneity Index[2] | $6 \leq H.I. \leq 100$ | $6 \leq H.I. \leq 75$ | $6 \leq H.I. \leq 50$ |
| High Load Melt Index[3] | $1.5 < H.L.M.I. < 15$ | $2 \leq H.L.M.I. \leq 12$ | $2 \leq H.L.M.I. \leq 10$ |
| Weight | $60 \leq W.P. \leq 95$ | $65 \leq W.P. \leq 92$ | $67 \leq W.P. \leq 90$ |

TABLE II-continued

| | High Molecular Weight Polyethylene Resin Characteristics | | |
|---|---|---|---|
| Characteristic | Broad Range | Preferred Range | Most Preferred Range |
| Percent[4] | | | |

[1] See footnote 1 Table I.
[2] See footnote 2 Table I.
[3] The High Load Melt Index is in grams per 10 minutes at FR 190/21.60.
[4] See footnote 4 Table I.

In another embodiment of this invention it is preferred that the high molecular weight ethylene copolymer resin be from 76 to 95 weight percent of the polymer composition where the weight percent is based on the weight of the low molecular weight ethylene homopolymer and the high molecular weight copolymer.

The high molecular weight polymer resin generally has a very high ESCR. Usually the ESCR of these polymers are so high that they cannot be practically measured.

Blending of Components

The blending of the components can be accomplished by any method known in the art which produces a homogeneous blend from two polymer resins. Standard polymer processing equipment can be used to make these blends such as, for example, single screw extruders, twin screw extruders, and continuous mixers. Additionally, during blending, other components can be added to the blend. These components can be antioxidants, UV stabilizers, preservatives, and processing aids such as fluoroelastomers. After blending it is important that the resin be easy to process. Generally, this means that the melt index of the polymer blend needs to be greater than 0.05 grams per 10 minutes. Preferably, the melt index of the blend is from 0.1 to 5 grams per 10 minutes ($0.1 \leq M.I. \leq 5$). Additionally, it is preferred if the ratio of the high load melt index to the melt index of the blend be less than 60, preferably from about 20 to about 50.

Furthermore, it is preferred, if the composition of matter comprising the ethylene homopolymer resin and the ethylene copolymer resin, is essentially free of any other ethylene polymers. The phrase "essentially free" means for the purposes of this specification that the composition of matter has only trace amounts of other ethylene polymers in its composition as impurities, and/or has only small amounts of ethylene polymers as additives. Generally, these other ethylene polymers, if present, will not substantially change the molecular weight distribution of the composition of matter. For example, if other ethylene polymers are present they will generally be less than 5 weight percent, preferably less than 2 weight percent, and most preferably less than 1 weight percent, of the composition of matter, where the weight percent is based on the total weight of the composition of matter.

EXAMPLE

This example is provided to further assist a person skilled in the art with understanding this invention. The particular reactants, conditions, and the like, are intended to be generally illustrative of this invention and are not meant to be construed as unduly limiting the reasonable scope of this invention.

The following test methods were used to determine the properties of the polyethylene samples.

(1) The density was determined in accordance with ASTMD 1505-85. This is a standard test method for determining the density of plastics. The density is reported in grams per cubic centimeter ($D = g/cm^3$).

(2) The flow rate was determined in accordance with ASTMD 1238-65T. This is a standard test method for determining the flow rate of a thermoplastic. Two different conditions were used to determine the flow rate. Condition 1 consisted of a temperature of 190° C. and a total load of 2.16 kilograms (FR-190/2.16) which is also called the melt index. Condition 2 consisted of a temperature of 190° C. and a total load weight of 21.60 kilograms (FR-190/21.60) which is also called the high load melt index.

(3) The environmental stress crack resistance was determined in accordance with ASTMD 1693-70. This is a standard test method for determining the environmental stress cracking resistance of ethylene plastics. The test specimens were prepared by the following procedure ASTMD 1928-80 Procedure C. The condition that the test was run at was condition A. The ESCR is reported in hours.

(4) The heterogeneity index (Mw/Mn), which is the weight average molecular weight (Mw) divided by the number average molecular weight (Mn), was determined using data collected by gel permeation chromatography. This gel permeation chromatography was accomplished with a Waters 150C chromatograph at 140° C. with 1,2,4-trichlorobenzene as a solvent. This is a standard test method for determining weight and number average molecular weights and molecular weight distributions.

Blend Preparation

The low molecular weight polyethylene resins and the high molecular weight polyethylene resins were stabilized with 0.05 weight percent of BHT (butylated hydroxytoluene), 0.03 weight percent of DLTDP (dilauryl thiodipropionate), and 0.04 weight percent calcium stearate based on the total weight of the resin. These two polyethylene resins were premixed in a container by agitation then they were placed in a mixer for more complete blending. In general, the blending was conducted in a Midget Banbury mixer at a temperature between 150° C. to 160° C. for approximately 5 minutes at a mixing speed of 130 rpm and any large pieces were then ground in a mill.

TABLE E1

| Low Molecular Weight Polyethylene Resins | | | |
|---|---|---|---|
| Number | Melt Index | Density | Mw/Mn |
| L1 | 304 | 0.9686 | 3.7 |
| L2 | 33 | 0.9697 | 3.7 |

Notes:
Resin L1 was made with a titanium chloride based catalyst.
Resin L2 was made with a chromium oxide based catalyst.

TABLE E2

High Molecular Weight Polyethylene Resins

| Number | High Load Melt Index | Density | Mw/Mn |
|---|---|---|---|
| H1 | 1.6 | 0.9604 | 21.4 |
| H2 | 2.4 | 0.9599 | 22.9 |
| H3 | 1.7 | 0.9500 | — |
| H4 | 12 | 0.9482 | 8.0 |
| H5 | 2.6 | 0.9594 | — |
| H6 | 9.7 | 0.9454 | — |

Notes:
Resins H1-H3, and H5 were made with a chromium oxide based catalyst.
Resins H4 and H6 were made with a titanium chloride based catalyst.
Resins H1-H4 and H6 were ethylene/hexene copolymers.
Resin H5 was an ethylene homopolymer.

TABLE E3

Polyethylene Blends

| Number | Ethylene Composition By Weight | Melt Index | High Load Melt Index | Density | ESCR (Condition A) |
|---|---|---|---|---|---|
| B1 | 33% L1 + 67% H1 | 0.20 | 70 | 0.9665 | 165 |
| B2 | 22% L1 + 78% H2 | 0.14 | 38 | 0.9599 | >1000 |
| B3 | 41% L1 + 59% H3 | 0.11 | 32 | 0.9618 | 267 |
| B4 | 23% L2 + 77% H4 | 0.24 | 32 | 0.9536 | 224 |
| B5 | 22% L1 + 78% H5 | 0.11 | 36 | 0.9653 | 124 |
| B5 | 26% L1 + 74% H6 | 0.84 | 30 | 0.9540 | 260 |

TABLE E4

Comparison Polymers

| Number | Melt Index | Density | ESCR |
|---|---|---|---|
| C1 | 0.3 | 0.949 | 500 |
| C2 | 0.35 | 0.952 | 50 |
| C3 | 0.35 | 0.957 | 45 |
| C4 | 1.0 | 0.957 | 30 |
| C5 | 0.75 | 0.964 | 15-20 |

The comparison polymers are all polyethylenes resins. They are all made from chromium catalyst systems except for HHN 5710 which was made from a titanium catalyst system. They can be obtained from the Phillips Petroleum Company as HHM 4903, HHM 5202, HHM 5502, HHN 5710, and EHM 6007, respectively.

Comparing the polyethylene blends of Table E3 with the Comparison Polymers of Table E4 it is apparent that blends B1 and B2 have a superior ESCR to all of the Comparison Polymers where the melt index and density are comparable. The only Comparison Polymer which has an ESCR greater than 50 also has a much lower density of 0.949 g/cm³. The densities of the inventive blends are significantly higher than Comparison Polymer C1's density.

The following can be observed from comparing the inventive blends to the comparison blends. Comparing blend B2 to blends B1 and B3 illustrates the importance of having more than 75 weight percent of the blend consisting of a high molecular weight ethylene component. Comparing blend B2 to blend B4 illustrates the importance of having the low molecular weight ethylene resin made by a titanium chloride based catalyst system. Comparing blend B2 to blend B5 illustrates how important it is that the high molecular weight ethylene resin be a copolymer. Comparing blend B2 to blend B6 illustrates how important it is to have the high molecular weight ethylene component made by a chromium oxide based catalyst system.

That which is claimed:

1. A composition of matter comprising:
   (a) 5 to 24 weight percent of a low molecular weight ethylene homopolymer resin, where said resin is made by polymerizing ethylene with a titanium chloride based catalyst system, and where said resin has a density greater than 0.96 grams per cubic centimeter, a melt index greater than 30 grams per 10 minutes, and a heterogeneity index from 2 to 8,
   (b) 76 to 95 weight percent of a high molecular weight ethylene copolymer resin, where said resin is made by copolymerizing ethylene and an alpha-olefin with a chromium oxide based catalyst system, and where said resin has a high load melt index greater than 1.5 grams per 10 minutes but less than 15 grams per 10 minutes, and a heterogeneity index from 6 to 100,
   where said weight percents are based on the total weight of said resins (a) and (b); and
   wherein said composition of matter has a melt index greater than 0.05 grams per 10 minutes and is essentially free of other ethylene polymers.

2. A composition according to claim 1 wherein said melt index of said low molecular weight ethylene homopolymer resin is from about 100 to about 400 grams per 10 minutes.

3. A composition according to claim 1 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1-hexene, and mixtures of two or more said alpha-olefins.

4. A composition of matter comprising:
   (a) 5 to 24 weight percent of a low molecular weight ethylene homopolymer resin, where said resin is made by polymerizing ethylene with a titanium chloride based catalyst system, and where said resin has a density greater than 0.96 grams per cubic centimeter, a melt index greater than 30 grams per 10 minutes, and a heterogeneity index from 2 to 8,
   (b) 76 to 95 weight percent of a high molecular weight ethylene copolymer resin, where said resin is made by copolymerizing ethylene and an alpha-olefin with a chromium oxide based catalyst system, and where said resin has a high load melt index greater than 1.5 grams per 10 minutes but less than 15 grams per 10 minutes, and a heterogeneity index from 6 to 100,
   where said weight percents are based on the total weight of said resins (a) and (b); and
   wherein said composition of matter has a melt index greater than 0.05 grams per 10 minutes and is free of other ethylene polymers.

5. A composition of matter according to claim 4 wherein said melt index of said low molecular weight ethylene homopolymer resin is from about 100 to about 400 grams per 10 minutes.

6. A composition of matter according to claim 4 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1-hexene, and mixtures of two or more said alpha-olefins.

* * * * *